Feb. 3, 1953 G. MUNRO 2,627,355
CARGO CARRIER
Filed July 12, 1947 6 Sheets-Sheet 3
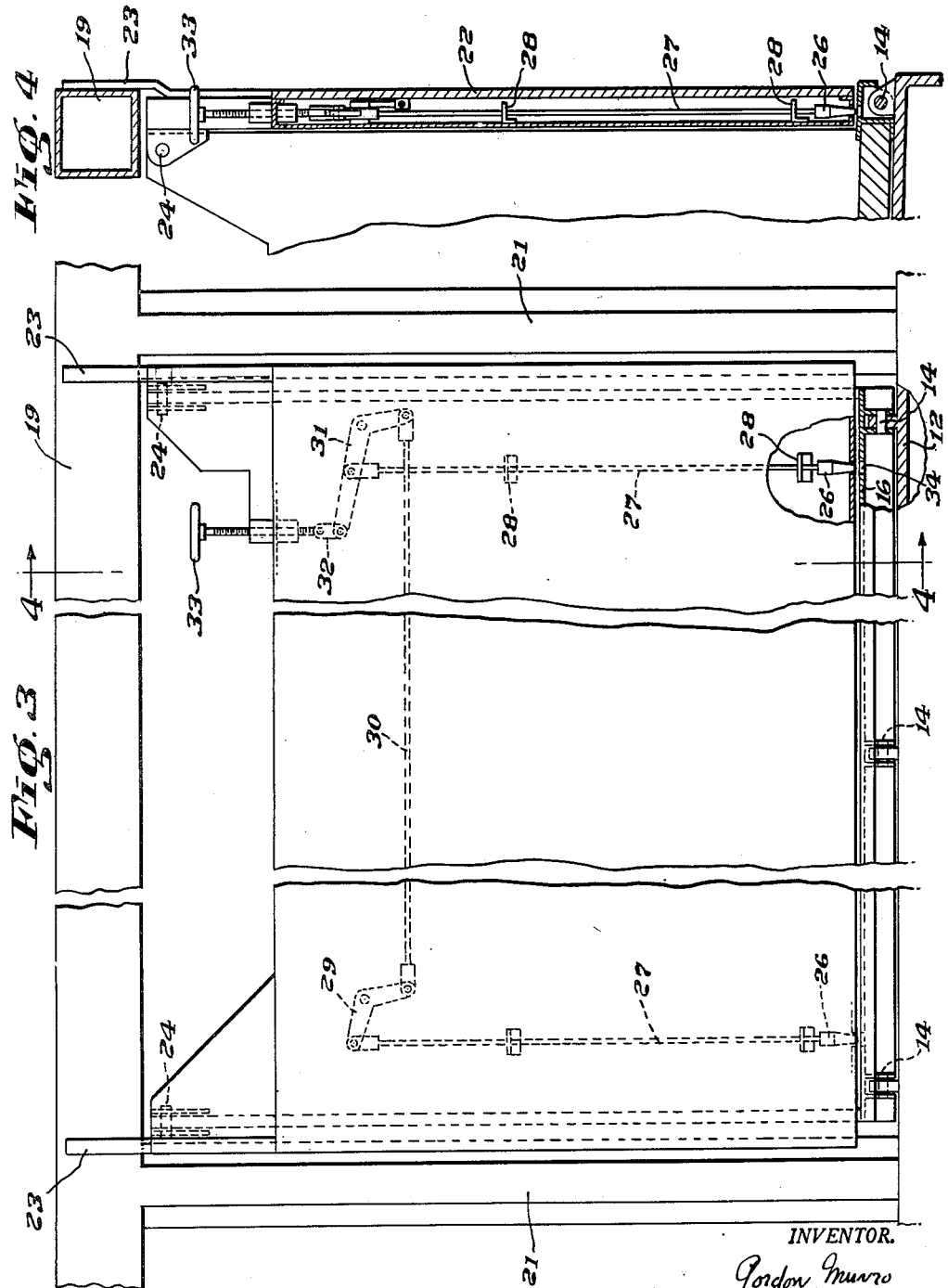
INVENTOR.
Gordon Munro
Rowland V. Patrick
BY
ATTORNEY

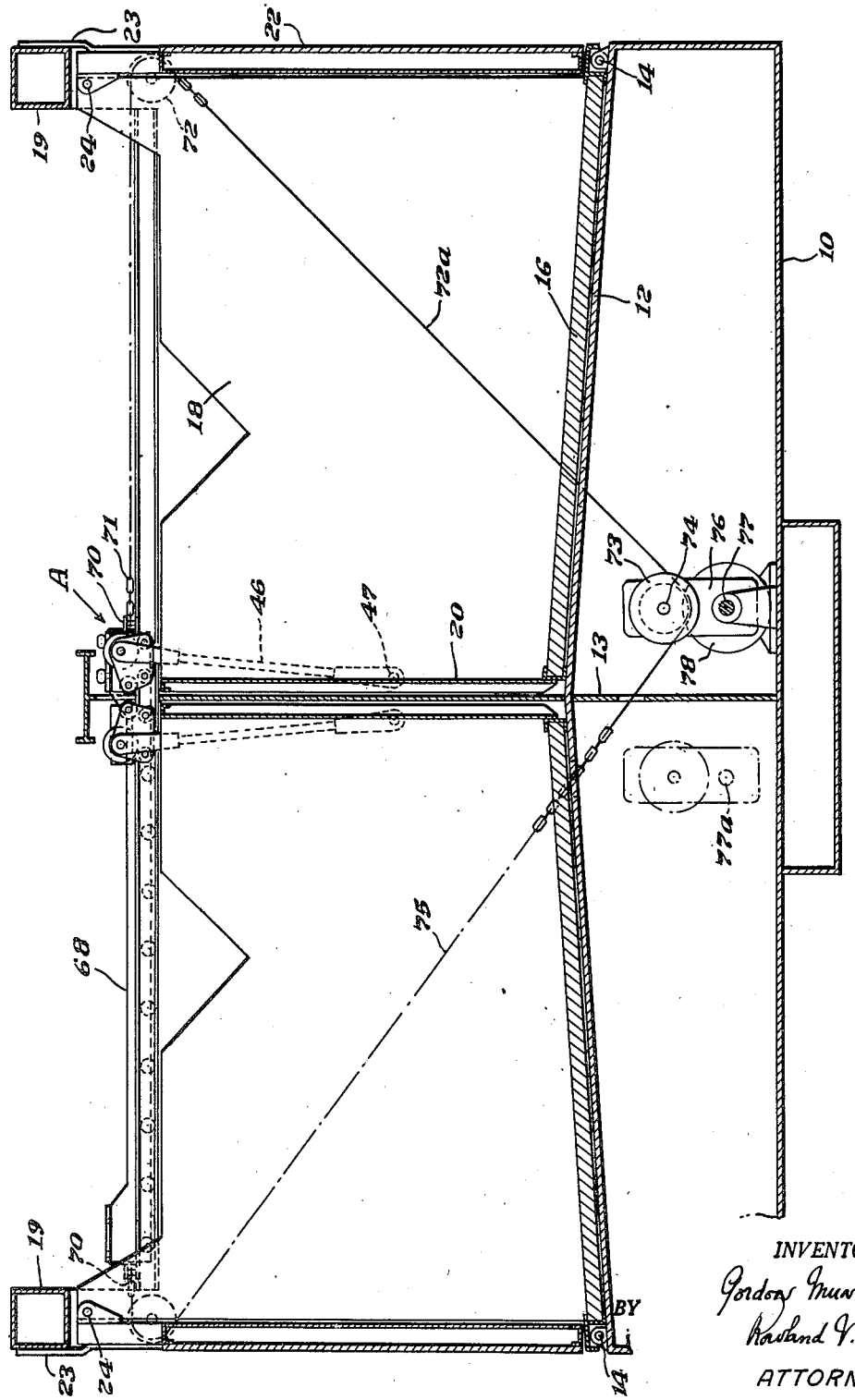

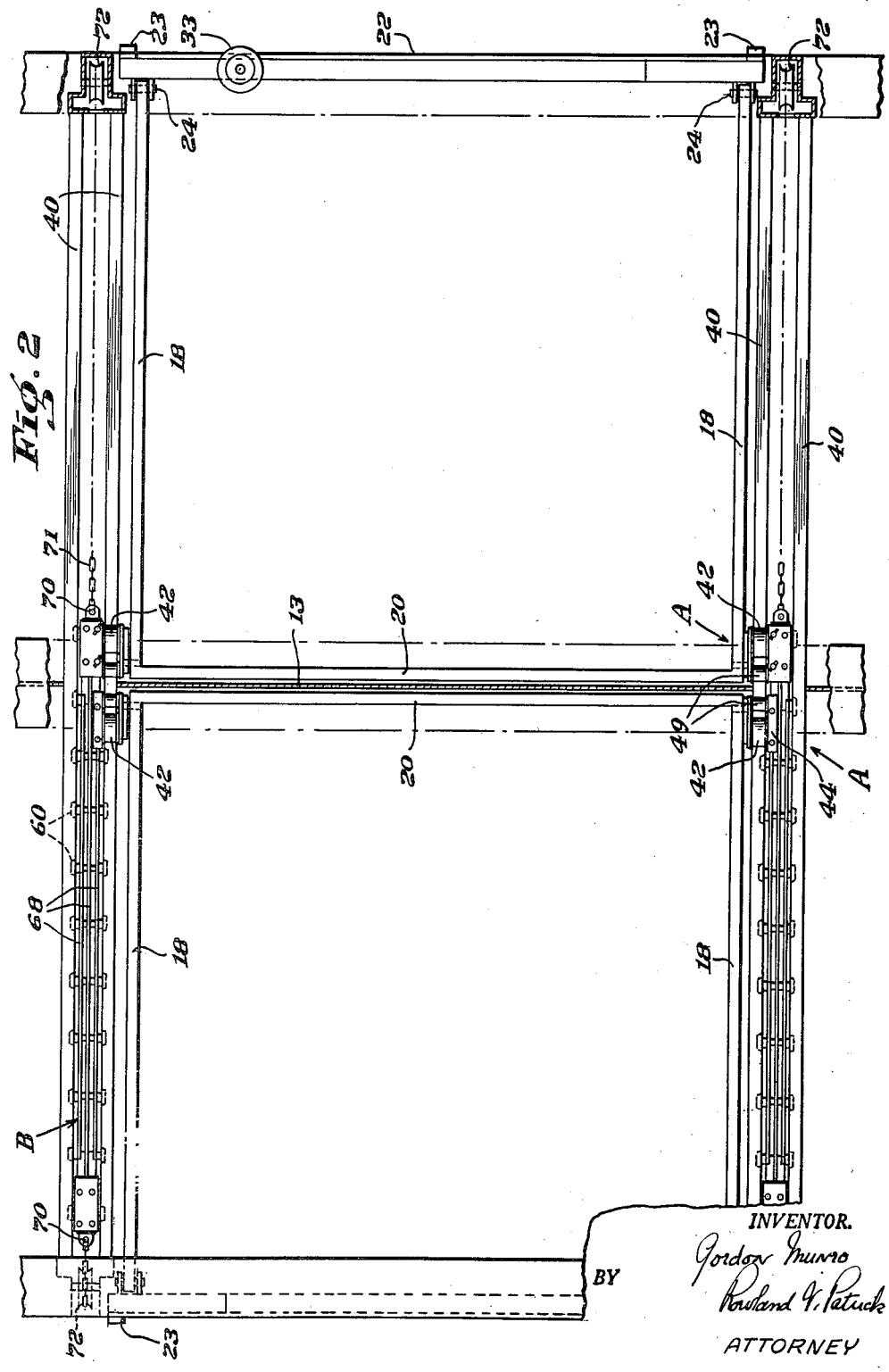

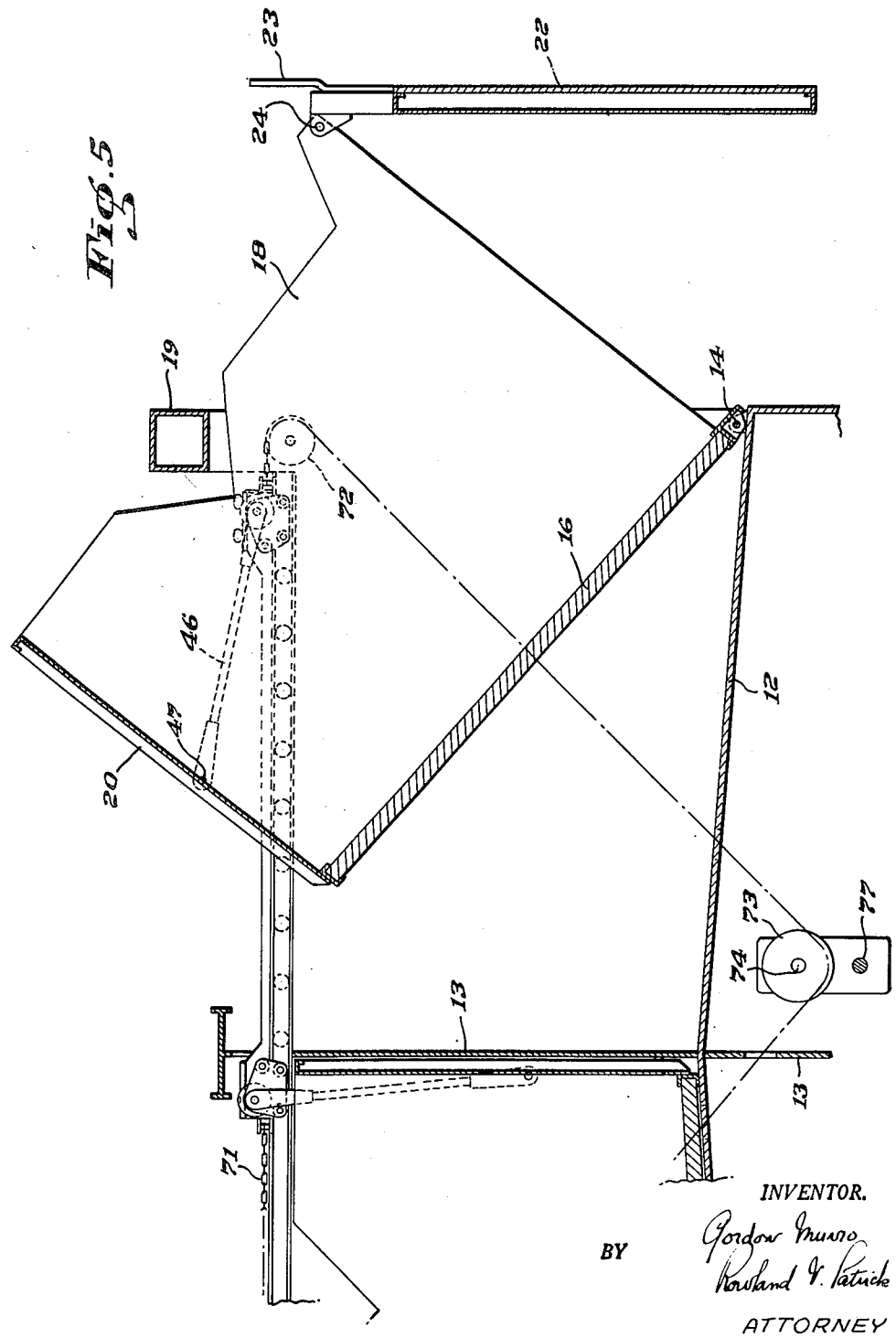

Feb. 3, 1953 G. MUNRO 2,627,355
CARGO CARRIER
Filed July 12, 1947 6 Sheets-Sheet 5
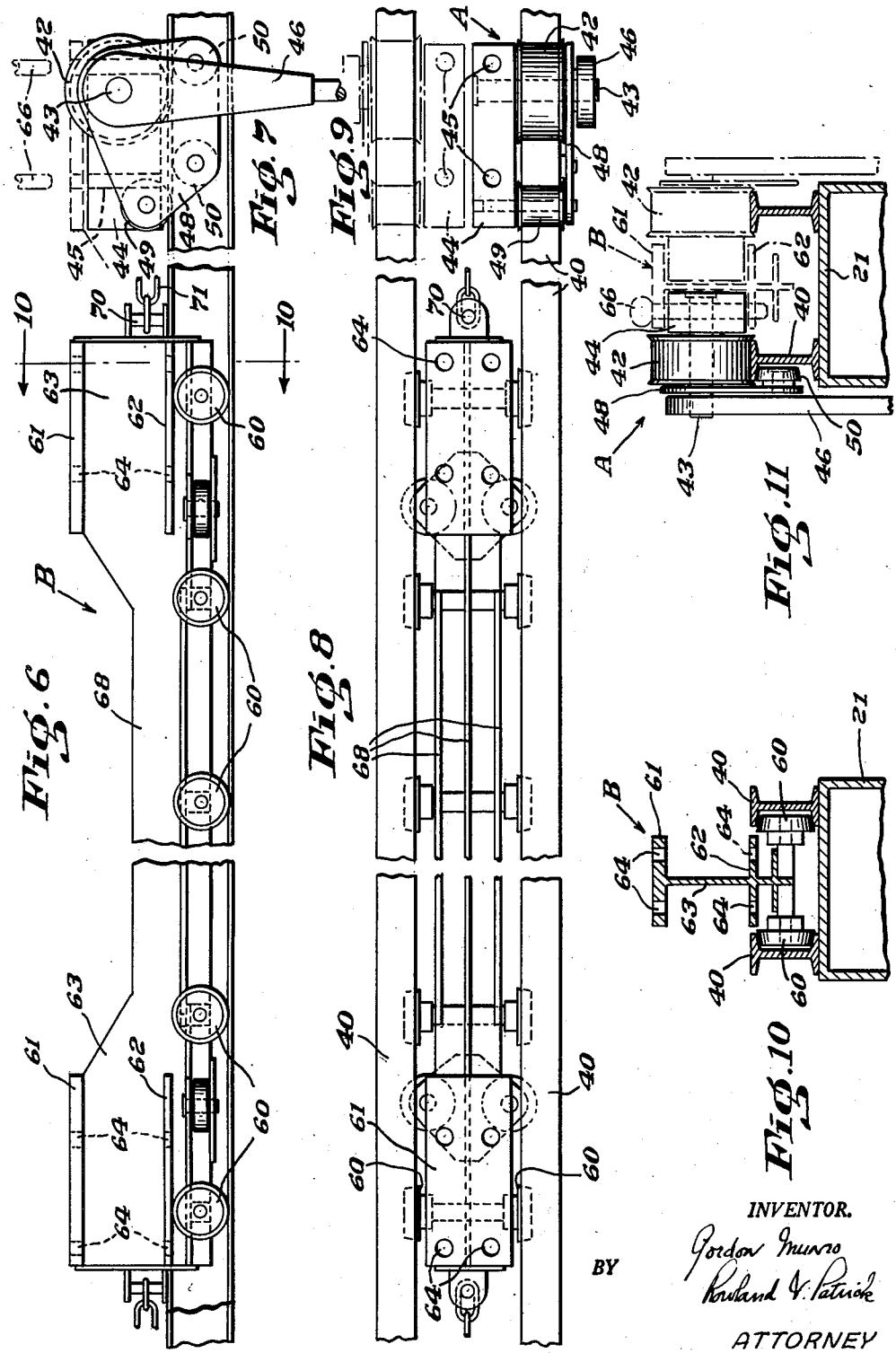
INVENTOR.
Gordon Munro
Rowland V. Patrick
BY
ATTORNEY Feb. 3, 1953  G. MUNRO  2,627,355
CARGO CARRIER
Filed July 12, 1947  6 Sheets-Sheet 6
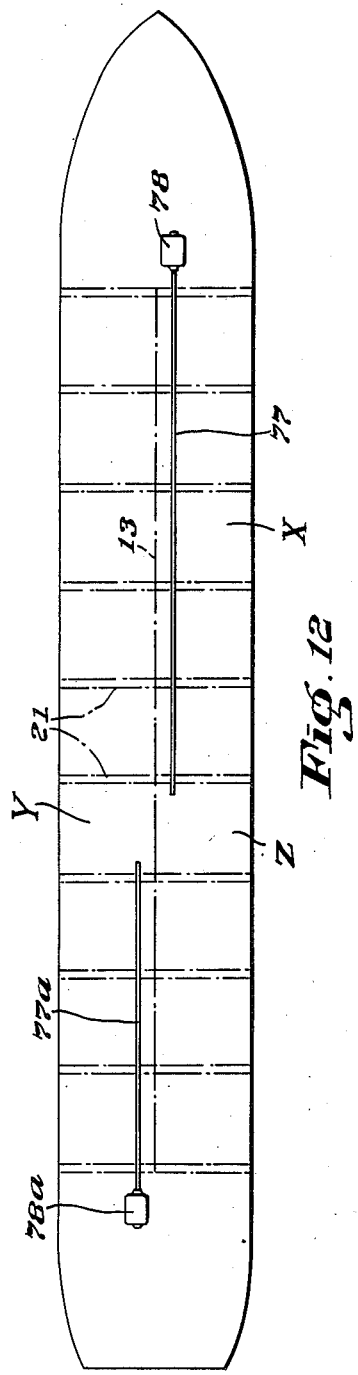
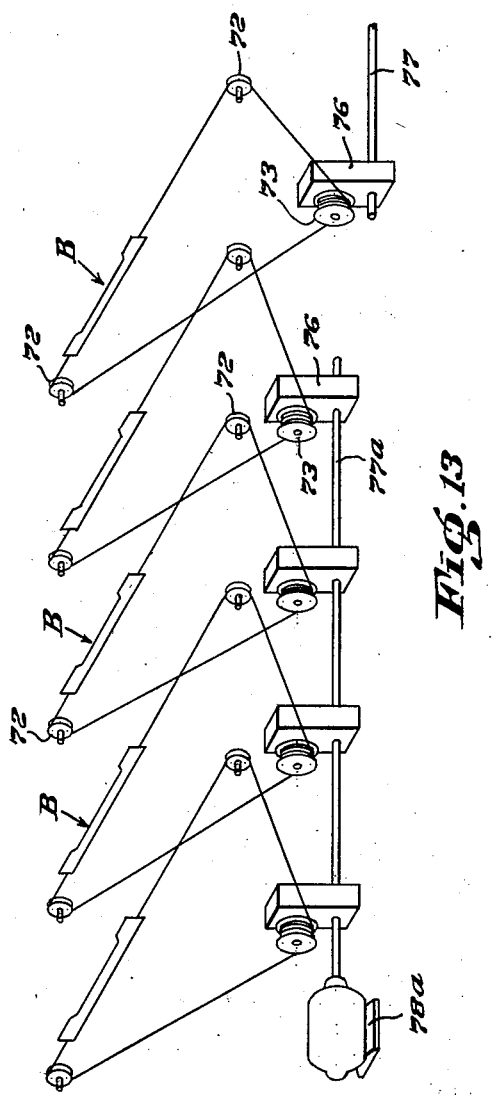
INVENTOR.
Gordon Munro
BY Rowland V. Patrick
ATTORNEY Patented Feb. 3, 1953

2,627,355

UNITED STATES PATENT OFFICE 2,627,355

CARGO CARRIER

Gordon Munro, Boston, Mass., assignor to Murray & Tregurtha, Inc., Quincy, Mass., a corporation of Massachusetts Application July 12, 1947, Serial No. 760,533

12 Claims. (Cl. 214—15)

This invention relates to cargo handling, and is concerned particularly with the compartmentalized marine bulk shipment of pulpwood.

The primary object of the invention is to provide a ship adapted to carry pulpwood in the ordinary 4-foot log lengths, and capable of more efficient operation by reason of surprisingly short loading and unloading periods. Contrary to present day pulpwood handling practice, particularly along the St. Lawrence, where the pulpwood is manually stacked in ship holds for grab or sling unloading, ships of this invention are adapted for direct loading from a flume, conveyor, jack ladder or other mechanical means, and unload either into the water or onto low docks by a dumping operation, without handling of the logs in less than whole-compartment groups.

Whereas present day pulpwood carriers require many hours to load and discharge the cargo, during which time the ship is lying idle, and also require a great amount of manual labor, a ship of this invention can handle a similar load in a small fraction of the time, requiring as little as one-half hour for the unloading operation, thus permitting a quicker round trip and greatly increasing the amount of cargo transported during the season.

This efficient operation is based upon loading of the pulpwood in cradles of about 30 cords capacity, each cradle being in effect an open-top deck-carried compartment, unloaded by a dumping over-the-side discharge. In the preferred form, the cradles are disposed in pairs athwartships, and the discharging mechanism for one compartment has cooperative relation with its paired compartment and certain elements common to adjacent compartments, partly for transferring available energy in the return movement of some of the cradles from discharging position to useful work in the discharging of other cradles, and partly for the purpose of simplifying the amount of mechanism.

The interchange and interconnection of the operating mechanisms are applicable to any form of cargo carrier, and hence, in these and other aspects, the utility of the carrier herein described is not confined to marine transportation of pulpwood, but has equal application to other carriers and cargoes, including railroad cars and truck and trailer vehicles carrying a wide variety of materials. Nevertheless, for the purpose of explanation, the structure of the invention as applied to a ship will be more fully described with reference to the accompanying drawings, wherein, Fig. 1 is a cross-sectional view taken athwart the ship along a line through an adjacent pair of compartments;

Fig. 2 is a plan view of one pair of compartments showing certain portions in cross-section;

Fig. 3 is a side elevation of one of the compartments shown in Fig. 2;

Fig. 4 is a cross-sectional view taken along the lines 4—4 of Fig. 3;

Fig. 5 is a cross-sectional view athwart the ship, showing one of the cradles in discharging position;

Fig. 6 is an elevational detail of part of the operating mechanism;

Fig. 7 is a similar view of another part of the operating mechanism;

Fig. 8 is a plan view of the mechanism shown in Fig. 6;

Fig. 9 is a plan view of the mechanism shown in Fig. 7;

Fig. 10 is a detail cross-sectional view taken along the line 10—10 of Fig. 6;

Fig. 11 is an end view taken from the right hand side of Fig. 7, showing in dot and dash lines certain parts not shown in Fig. 7;

Fig. 12 is a diagrammatic plan of a ship, indicating the general arrangement of the compartments; and Fig. 13 is a diagrammatic illustration of the power mechanism for operating the cradles.

In the drawings, the invention is applied in the construction of a ship in such manner as to provide a series of 18 compartments, 9 on each side of the ship, back to back with the other 9, as indicated in Fig. 12. In such manner, the compartments on one side of the ship unload over that side of the ship, and the compartments on the other side unload over the other side of the ship.

One pair of the compartments athwart the ship is illustrated in Fig. 1. As shown, the ship includes a hull portion 10 having a bottom deck 12, which is slightly inclined from the keelson structure 13 to both sides. Resting on this deck 12 and pivoted thereto along its outer sides at 14 are two adjacent back to back cradles, having floors 16, sides 18, and inner vertical end portions 20, to form open top cradles. The cradles are of such size that they substantially fit between the double cross bulkheads 21 of the ship, beneath side catwalks 19, and close to each side of the keelson bulkhead 13. The outer end of each cradle is provided with a closure member 22 in the form of a swinging gate-like member suspended from sides 18 for pivotal movement about an axis 24. Thus, as shown in Fig. 5, as a cradle is pivoted to discharging position the closure member 22 swings on its axis 24 to open the end of the cradle. As the cradle returns to normal position, the closure member 22 automatically swings back, being forced into closed position by means of arms 23 coming into contact with the longitudinal girders 19 with a lever action which forces the closure member into the closed position.

In Figs. 3 and 4 there is illustrated a form of mechanism for holding the closure member 22 in closed position, including pins 26 mounted on the lower ends of rods 27, passing loosely through brackets 28, and linked as by the linkages 29, 30, 31 and 32, to a hand wheel 33. Through operation of the linkages by the hand wheel 33, the pins 26 may be lowered from the position shown in Figs. 3 and 4 downwardly to extend into suitable apertures 34, formed in the floor 16 of the cradle.

The mechanism for pivoting or tilting the cradles is supported on athwart-ship rails or trackways 40. A pair of these rails, which may conveniently be I-beams, extends across the top of each transverse double bulkhead 21, as indicated in Fig. 2. Each rail carries a pair of roller assemblies A, each assembly having a roller 42, and the roller at one end of the rail being associated with the cradle on one side of the ship, and the roller at the other end of the rail being associated with the back-to-back cradle on the other side of the ship. Thus each cradle has two roller assemblies A, one on each of the two rails 40 immediately adjacent the cradle. As shown in Figs. 7, 9 and 11, a pin 43 extends outwardly from each side of each roller 42, the pin on the side of the roller between the tracks 40 carrying a block 44 having two vertical apertures 45; and the pin on the opposite side of the roller adjacent the cradle pivotally carrying a strap 46 which extends downwardly as shown in Fig. 1 to a point 47 of pivotal connection on the outside of a side portion 18 of the cradle. In order to steady the roller assembly it carries a plate 48 in which is journaled an upper guide roller 49, also traveling on track 40, and two auxiliary under guide rollers 50, bearing against the under surface of the upper flange of the I-beam trackway 40, to clamp the roller assembly to the trackway.

As will be understood, when the roller assembly is moved from a position near the center line, as shown in Fig. 1, along the trackway 40 towards the side of the ship, the connection of the strap 46 with the cradle will cause it to pivot about axis 14 to substantially the position shown in Fig. 5.

In order to cause such movement of the roller assemblies A, each adjacent pair of trackways 40 is provided with a coupling device, generally indicated at B. The coupling device is supported by a series of rollers 60 (Fig. 6), which travel in pathways between the flanges of the I-beam trackways 40, and as shown in Fig. 10, has an upper flange 61 and a lower flange 62, each provided on either side of a central web 63 with a pair of apertures 64, spaced from one another a distance to permit their simultaneous entry into the spaced apertures 45 in the roller assemblies A. The flanges 61 and 62 are spaced vertically from one another a safe distance to accommodate the height of block 44 of the roller assembly A. And, as shown in Fig. 11, when the coupling levice B is moved along the trackways 40, the flanges 61 and 62 will span the block 44 and the coupling device can be brought to a position so that a set of two upper and lower apertures 64 on one side of web 63 are in register with apertures 45 for the reception of pins 66, which tie the coupling device B to a roller assemly A, as shown in Fig. 11.

While the coupling device has just been described with respect to only one roller assembly A, the coupling device is common to the rollers on two adjacent rails 40, as indicated in Fig. 11, and the pins 66 may be selectively placed on one side or the other of the coupling device to couple it to either one of the adjacent rollers 42.

A further feature is that the coupling device B is 2-ended with the parts duplicated at each end thereof, as indicated in Fig. 1, the intervening connecting parts 68 being of such length that when one end of the coupling device B is coupled to the roller assembly A on the right hand side of Fig. 1, the other end of the coupling device will be in a position at the outer end of the trackway 40, all as shown in Fig. 1. As, however, the coupling device B and coupled roller assembly A is moved to the right in Fig. 1, the left hand end of the coupling device B will be brought towards the center line of the ship to a position where it can be coupled to the roller assembly associated with the left hand compartment shown in Fig. 1.

Each coupling device B may thus be coupled selectively to any one of four different roller assemblies A.

In order to move each coupling device B back and forth between its pair of rails 40, each end of the device B is provided with a pin 70 to which is attached a chain 71 which passes around a sheave 72, journaled between the double bulkheads 21, and downwardly to a connection with a wire rope 72a which passes helically around a drum 73 fixed on a longitudinal shaft 74 and upwardly to a point of connection with another chain 75, passing about a similar sheave 72 at the other side of the ship to a point of connection at pin 70 at the other end of the coupling device B. As shown in Fig. 13, each drum 73 is connected through a gear box 76 with a longitudinally extending shaft 77 driven by a motor 78. For reasons which will presently appear, the shaft 77 operates only certain of the coupling devices B, and a second shaft 77a and motor 78a, disposed on the opposite side of the center line from the shaft 77, is utilized for operating the remainder of the coupling devices. Each of the motors is reversible.

The operation of a single cradle is as follows: The cradle being open at the top, it can be loaded from a flume or by mechanical means. Whenever it is desired to discharge the load overside, the pins 26 holding the closure member 22 closed are first raised by operation of the handwheel 33, the two coupling members B on each side of the cradle are then both brought to one limit of their travel, for example to the left, as shown in Fig. 2, and pins 66 are inserted in the coupling devices to couple one of them to the roller assembly A attached by a strap 46 to one side of the cradle, and to couple the other to the other assembly A attached by a strap 46 to the other side of that cradle. If this cradle happens to be the one in the location X of Fig. 12, the motor 78 is actuated to drive shaft 77, and the drums 73 move the chains 71 to pull the two coupling devices B along trackways 40 toward the outer edge of the ship to lift the inner end of the cradle to the position shown in Fig. 5. Upon reaching the limit of movement the motors are stopped (by automatic limit switches if desired). When the coupling devices have reached this point, their opposite ends will be in position for coupling with the two roller assemblies A associated with the other cradle shown in Fig. 2, and by reversing motor 78, the left hand cradle can then be emptied, during which time the return movement of the right hand cradle will aid in moving the coupling device back to the left, since the now empty right hand cradle is still coupled to the coupling devices being utilized to unload the left hand cradle.

When both of these back-to-back cradles have been unloaded, the pins 66 may be again removed and transferred to the other sides of the coupling devices for subsequent unloading of adjacent cradles.

The two motors are provided so that simultaneous unloading can take place on both sides of the ship. If all the coupling devices were driven by one motor, all the coupling devices would be drawn from left to right or vice versa at the same time. By utilization of the two motors 78 and 78a, and connected shafting, one motor can be driven one way and the other motor the other way, so that while some cradles at one end of the ship are being unloaded at one side, other cradles at the other end of the ship can be unloaded at the other side. This means, however, that both motors 78 and 78a must be used for unloading cradles at locations Y and Z of Fig. 12.

It will be understood that in preferred operation, one coupling device B is utilized to unload only one cradle at a time; no two back-to-back cradles can be unloaded simultaneously and it is preferred not to unload two longitudinally adjacent cradles simultaneously, though it can be done.

It has been found that by reason of the nature and design of the unloading mechanism described, the cradles may be pivoted with the exertion of a surprisingly small amount of energy. During the initial cycle of the operating mechanism, the movement of the roller along the trackway is great in ratio to the distance of lift. This ratio is reduced during advance of the cycle, but is offset by the fact that a load such as pulpwood commences to drop out of the cradle before the cycle has advanced very much, so that as the load is reduced in weight, the ratio is lessened. Furthermore, the utilization of the same mechanism for selectively unloading more than one cradle reduces the number of parts, and simplifies construction and maintenance problems.

I claim:

1. A cargo carrier comprising a base, vertical cross frames forming a compartment having an open side, a tiltable cradle also having an open side fitted into the compartment with its open side in register with the open side of said compartment, said cradle being pivoted to said base for tilting movement about a horizontal axis extending along the bottom of the open side of the cradle, a pair of trackways supported on said vertical frames one at each end of but substantially above and normal to said axis, a roller on each trackway, a strap pivotally connected to each roller, extending downwardly from each roller and pivotally connected to said cradle at a point on the opposite side of the center of gravity of the cradle from said axis, said straps being of such length as to tilt the cradle about said axis as said rollers are moved along said trackways from positions remote from said axis towards said axis, and power means adapted to be connected to said rollers for moving said rollers from a position remote from said axis toward said axis to tilt said cradle about said axis to discharge a load carried in said cradle overside said carrier.

2. A cargo carrier as claimed in claim 1, wherein the compartment and cradle have open tops in register.

3. A cargo carrier as claimed in claim 1, wherein said cradle has a closure member for its open side.

4. A cargo carrier as claimed in claim 1, wherein said cradle has a closure member for its open side hingedly suspended to the cradle along a pivot line extending across the open side thereof for movement from a position closing the open side of the cradle when said cradle is in normal non-tilted position to an open position as said cradle is moved to tilted position.

5. In a compartmentalized cargo carrier, a pair of back-to-back tiltable cradles pivoted at the outer sides of said carrier for discharging loads carried in said cradles in opposite directions overside said carrier, supporting frames beside said cradles including a pair of substantially parallel rails, one on each side of said cradles, a pair of rollers on each rail forming sets of two rollers for each cradle, and straps pivotally connecting the rollers of each set to opposite sides of its cradle, said straps being of such length as to tilt each cradle as its connected rollers move along said rails from positions adjacent the inner end of the cradle outwardly to positions adjacent the outer end of the cradle.

6. In a compartmentalized cargo carrier as claimed in claim 5, a power source and connected mechanism for moving the rollers outwardly along said rails.

7. In a compartmentalized carrier as claimed in claim 5, a coupling device associated with each rail adapted to detachably connect the pair of rollers on each rail together for joint movement along each rail.

8. In a compartmentalized cargo carrier as claimed in claim 5, a power source and coupling devices for detachably connecting said source selectively to the rollers of each said set for moving said rollers outwardly along said rails.

9. A cargo carrier comprising a base, vertical cross frames forming a plurality of compartments having open sides, a tiltable cradle also having an open side fitted into each of said compartments with its open side in register with the open side of said compartment, said cradle being pivoted to said base for tilting movement about a horizontal axis extending along the bottom of the open side of the cradle, trackways supported on said vertical frames one at each end of each of said compartments being substantially above and normal to the axis of the cradle in said compartment providing a pair of trackways between each of said compartments, a roller on each trackway, a strap pivotally connected to each roller extending downwardly from each roller and pivotally connected to the cradle immediately adjacent thereto at a point on the opposite side of the center of gravity of the cradle from its axis, said straps being of such length as to tilt each cradle about its axis as its rollers are moved along said trackways from positions remote from said axis towards said axis, said rollers being adapted for connection to power mechanisms for moving said rollers back and forth along said trackways.

10. In a compartmentalized cargo carrier as claimed in claim 9, a power source and coupling device associated with said pair of trackways for detachably connecting said source selectively to the rollers connected to each cradle for moving said rollers along said trackways, the coupling device associated with said pair of trackways being common to the rollers on both of said trackways for selective connection of said source to one or the other of said rollers.

11. In a compartmentalized cargo carrier, at least two pairs of tiltable cradles pivoted at the outer sides of said carrier for discharging loads carried in said cradles in opposite directions overside said carrier, supporting frames at the outer sides of said cradles and between each pair of cradles, each of said outer frames including a substantially horizontal rail, and the between frame including a pair of substantially horizontal rails parallel to the outer frame rails, a pair of rollers on each rail, straps pivotally connecting each roller to a side of a cradle, said straps being of such length as to tilt each cradle as its connected rollers move along said rails from positions adjacent the inner end of the cradle outwardly to positions adjacent the outer end of the cradle.

12. In a compartmentalized cargo carrier as claimed in claim 11, a power source and coupling devices mounted on said rails for detachably connecting said source selectively to the rollers for moving said rollers along said rails, the coupling device mounted on said between frame rails being common to four rollers, two on each of said pair of rails, for selective connection to said four rollers.

GORDON MUNRO.

REFERENCES CITED

The following references are of record in the file of this patent:

UNITED STATES PATENTS

| Number | Name | Date |
| --- | --- | --- |
| 213,387 | Church et al. | Mar. 18, 1879 |
| 547,095 | Sutcliffe et al. | Oct. 1, 1895 |
| 998,432 | Walker | July 18, 1911 |